United States Patent Office 3,553,975
Patented Jan. 12, 1971

3,553,975
REFRIGERATOR TEMPERATURE AND DEFROSTING CONTROL
Yoshiyasu Sakamoto, Oizumi-machi, Oora-gun, Japan, assignor to Sanyo Electric Co., Ltd., Moriguchi-shi, and Tokyo Sanyo Electric Co., Ltd., Oora-gun, Japan
Filed Aug. 7, 1968, Ser. No. 750,933
Claims priority, application Japan, Aug. 7, 1967, 42/67,958; Aug. 9, 1967, 42/51,136; Aug. 19, 1967, 42/53,171
Int. Cl. F25d 21/06
U.S. Cl. 62—156                             9 Claims

ABSTRACT OF THE DISCLOSURE

Temperature and defrosting control apparatus is described including a circuit for controlling the operation of the refrigerator compressor in response to temperature signals from one or more thermosensitive resistance elements disposed at locations within the refrigerating and freezing chambers, and a defrosting control circuit for initiating the defrosting cycle in response to a timing device and terminating the defrosting cycle in response to temperature signals from one or more of the thermosensitive resistance elements.

---

This invention relates to a refrigerator temperature control circuit, especially to a temperature control circuit for maintaining refrigerator temperature within a desired range by sensing the temperature within the refrigerator and controlling the starting and stopping of the refrigerator compressor in accordance therewith. This invention also relates to a defrosting control circuit which starts defrosting of the evaporator in response to a timing device, and terminates the defrosting in response to the sensing of the temperature level.

In the conventional refrigerator, the temperature variation within the refrigerator is sensed by a temperature regulator of gas-sealed type or bimetal type, and by controlling the operation of a freezer the temperature is maintained within a desired range. But since said temperature regulator is constituted mostly of mechanical mechanism it is difficult to narrow the range between the temperature at which the refrigerator compressor is started and the temperature at which the refrigerator compressor is stopped. Further, the temperature response of the conventional temperature regulator is slow, and, in addition, due to leakage of sealed gas or debasement of spring characteristic of the bimetal, troubles occur often. In the case of conventional defrosting control circuits, there are disadvantages similar to those of conventional temperature control circuits, and sufficient reliability and stability cannot be obtained.

It is therefore an object of this invention to provide an improved refrigerator temperature control circuit in which the temperature variation is converted to an electrical variation for controlling the operation of a freezer.

It is also an object of this invention to provide a refrigerator temperature control circuit for controlling the operation of a freezer by means of a plurality of temperature detectors arranged at respectively different places within the refrigerator.

It is another object of this invention to provide an improved defrosting control circuit for starting the defrosting cycle by means of a timing structure and terminating the defrosting cycle by sensing the temperature variation with temperature detector.

It is a further object of this invention to provide an improved defrosting control circuit for certainly terminating the defrosting of two evaporators which are disposed in different temperature regions respectively.

It is still another object of this invention to provide an improved refrigerator temperature control circuit provided with a protection circuit for disabling a temperature control circuit during the defrosting operation.

According to the above and other objects, the present invention provides a temperature control circuit in which the temperature variation is converted directly to a voltage variation by a thermosensitive resistor element such as a thermistor, a nonlinear amplifier circuit is operated by the voltage variation, and a relay is controlled by the operation of the amplifier circuit to start or stop operation of a compressor.

Another feature of this invention is that the temperature variations at a number of different places in the refrigerator are converted to a voltage variations by a plurality of thermosensitive resistor elements, and a logic sum circuit, such as a Schmitt trigger circuit is operated by the voltage variations to start or stop the operation of a freezer.

Other objects and features of this invention will be more clearly understood from the following detailed description and accompanying drawings, in which.

Briefly, the temperature control circuit of this invention includes a converter which converts the temperature viration directly to electrical variation. This converter is preferably a thermosensitive resistor element which is provided at a suitable place within the refrigerator and the resistance value of which varies in response to the temperature variation. A Schmitt trigger circuit is operated by the voltage variation produced by the thermosensitive resistance element. Control of the operation of the refrigerator compressor is accomplished by an electromagnetic relay which is enable or disenabled in response to the operation of the Schmitt trigger circuit, so that the temperature within the refrigerator is maintained at the desired level. The defrosting control circuit of this invention includes a latch circuit which is made conductive by a switch which closes for an instant to start the defrosting, and which is made nonconductive by the operation of the thermosensitive resistance element to terminate the defrosting.

Figure 1:
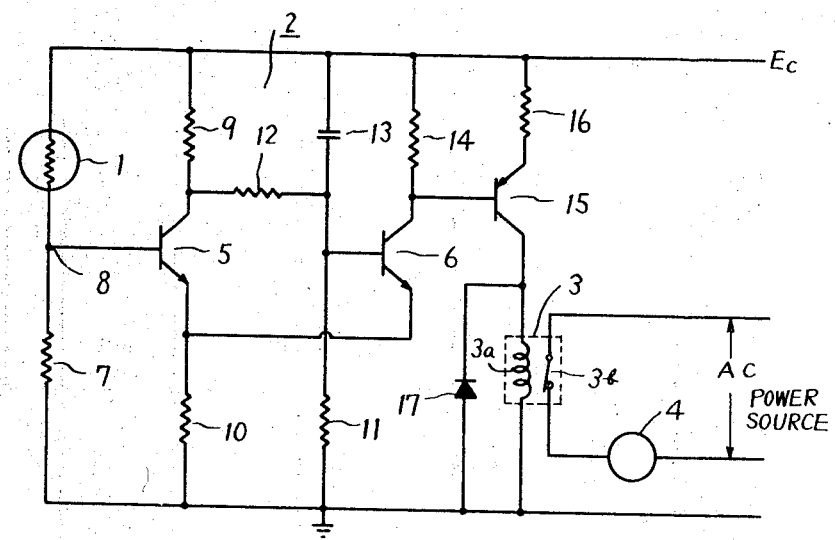
FIG. 1 is a diagram of the refrigerator temperature control circuit in accordance with this invention.

Referring to the circuit diagram of FIG. 1, thermistor 1 is disposed within a refrigerator so that its resistance value varies in response to the temperature variation. A Schmitt trigger circuit 2 and an electromagnetic relay 3 are operated by thermistor 1 to control the operation of a compressor 4. The Schmitt circuit 2 includes a pair of NPN transistors 5 and 6 having their emitters connected in common. The base of transistor 5 is connected to a connecting point 8 between thermistor 1 and a resistor 7, the collector thereof is connected to a D.C. power source $E_c$ through a resistor 9, and the emitter thereof is connected to a grounding line through a resistor 10. The base of transistor 6 is connected to the grounding line through a resistor 11 and is also connected to the collector of transistor 5 through a resistor 12, and is also connected ot the D.C. power source $E_c$ through a condenser 13. The collector of transistor 6 is connected to the D.C. power source $E_c$ through a resistor 14. The base of a PNP type transistor amplifier 15 is connected to the collector of transistor 6. The emitter of transistor amplifier 15 is connected to the D.C. power source $E_c$ through a resistor 16 and the collector thereof is connected to the grounding line through the electromagnetic coil 3a of an electromagnetic relay 3. The contact point 3b of electromagnetic relay 3 is serially connected to the compressor 4. A diode 17 is connected in parallel to the electromagnetic coil 3a to prevent reverse current from flowing through the electromagnetic coil 3a.

In order to illustrate the operation of the circuit of FIG. 1, let use suppose that the temperature within the refrigerator has fallen below a predetermined value. As a consequence of this condition, the resistance value of the thermistor 1 will be large and the potential of the connecting point 8 will be low. Transistor 5 will therefore be nonconductive, and transistor 6 will be conducting. Accordingly, amplifying transistor 15 will also be conducting, and therefore the electromagnetic coil 3a which is connected to the collector of transistor 15 is in a magnetized state thus opening contact point 3b, so as to shut off the compressor 4. While the compressor 4 is shut off, the temperature within the refrigerator gradually rises with the time. In response to the rise of the temperature the resistance value of the thermistor 1 decreased, and, accordingly, the potential of the connecting point 8 rises. When the potential rises to a certain level, transistor 5 of the Schmitt circuit 2 switches from its nonconductive state to its conductive state, and the transistor 6 switches from its conductive state to is nonconducive state. When transistor 6 becomes nonconductive the amplifying transistor 15 also becomes nonconductive, and the electromagnetic coil 3a is disenabled, thus causing contact point 3b to close, and compressor 4 to start its operation.

As is well known, there is a ceratin voltage difference between the input voltage for switching the Schmitt circuit from its conductive state to its nonconductive state and from its nonconductive state to its conductive state. This volage difference can be varied to a certain extent as desired by varying the resistance value of the Schmitt circuit and the D.C. power source $E_c$. This voltage difference corresponds to the temperature differential of the ON point and OFF point in a conventional thermostat.

Figure 2:
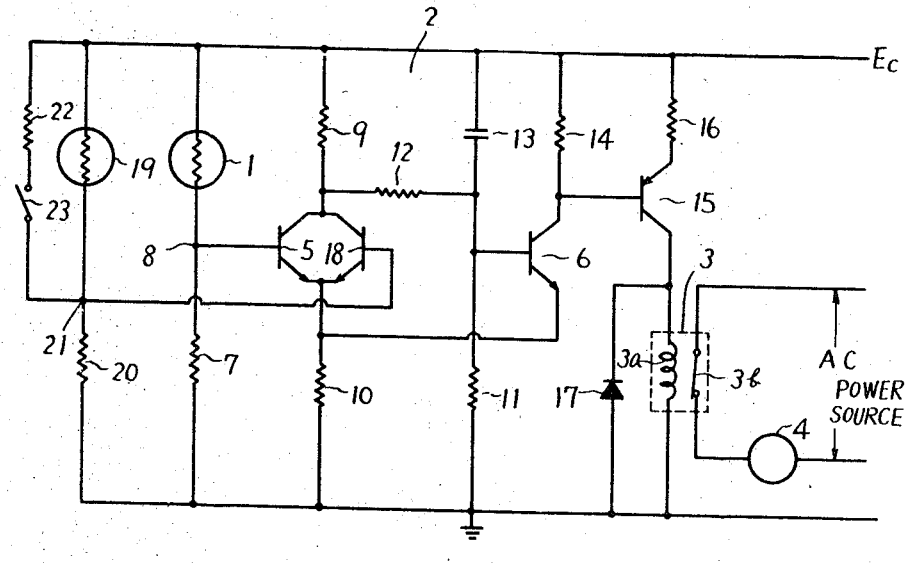
FIG. 2 is a diagram of a modified refrigerator temperature control circuit in accordance with this invention.

The circuit of FIG. 2 is similar to that of FIG. 1 with the addition of an NPN transistor 18 and a thermistor 19. The two thermistors 1 and 19 detect different temperatures and jointly control the operation of the compressor 4. For example, the thermistor 1 may be used to detect the temperature within the refrigerating chamber or the temperature of the evaporator for the refrigerating chamber, and the thermistor 19 may be used to detect the temperature or the evaporator for the refrigerating chamber or the temperature of the evaporator for the freezing chamber. The collector and the emitter of the transistor 18 are respectively connected to the collector and the emitter of the transistor 5 of Schmitt circuit 2. The base of transistor 18 is connected to the connecting point 21 between the thermistor 19 and a resistor 20. The two transistors 5 and 18 constitute a logic sum circiut. A serial circuit of a resistor 22 and a switch 23 is connected in parallel with the thermistor 19, so that the temperature characteristic of the thermistor 19 may be switched by the opening and closing of the switch 23.

In the embodiment shown in FIG. 2, the resistance values of the thermistors 1 and 19 vary separately, and when at least one of the transistors 5 and 18 is conductive the compressor 4 operates. The operations of the other portions of the circuit of FIG. 2 are the same as in the embodiment shown in FIG. 1.

Figure 3:
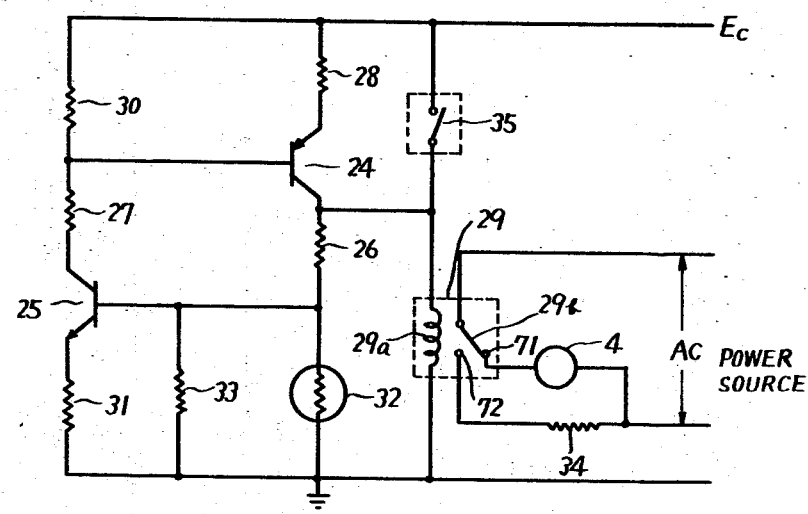
FIG. 3 is a diagram of refrigerator defrosting control circuit in accordance with this invention.

The defrosting control circuit shown in FIG. 3 includes a latch circiut including complementary transistors which are base-collector coupled. More specifically, the base of a main PNP type transistor 24 is connected through a resistor 27 to the collector of a supplementary NPN transistor 25, and the base of the supplementary transistor 25 is connected to the collector of the main transistor 24 through a resistor 26. The emitter of the main transistor 24 is connected to the D.C. power source $E_c$ through a resistor 28, and the collector thereof is connected to the grounding line through the electromagnetic coil 29a of an electromagnetic relay 29. The collector of the supplementary transistor 25 is connected to the D.C. power source $E_c$ through the resistor 27 and a resistor 30, and the emitter thereof is connected to the grounding line through a resistor 31. Further, a resistor 33 and a thermistor 32 for sensing the temperature of the evaporator are connected in parallel between the base of the supplementary transistor 25 and the grounding line.

The movable contact member 29b of electromagnetic relay 29 may contact either of the contact points 71 or 72 so as to alternately operate compressor 4 or defrosting heater 34. The movable contact 29b is normally connected to the contact point 71 so that the compressor 4 is operated. A defrosting starting switch 35 including a timing device such as a timer or a counter (not shown) which is provided between the collector of the main transistor 24 and the D.C. power source $F_c$.

Next, the operation of the defrosting control circuit shown in FIG. 3 will be explained. When the defrosting starting switch 35 is closed for an instant by its timing device (not shown) the supplementary transistor 25 conducts, and due to the conduction of the supplementary transistor 25 the main transistor 24 also conducts, thereby "latching" the circuit. When the supplementary transistor 25 conducts, the defrosting starting switch 35 is opened, the latch circuit maintains its conduction state. The electromagnetic coil 29a is energized to switch the contact member 29b to contact point 72, thus causing the defrosting heater 34 to generate heat to melt any frost which may have adhered to the evaporator. When the frost on the evaporator is completely removed, the resistance value of the thermistor 32 decreases, and the base potential of the supplementary transistor 25 drops, thus causing the supplementary transistor 25 to become nonconductive, thus releasing the latch circuit. When the latch circuit is released, the electromagnetic coil 29a is disenabled, so that the contact member 29b is switched to the contact point 71 to activate the compressor 4, and cooling operation is started again. In the case that there is not provided a defrosting heater 34, natural defrosting is accomplished simply by stopping the compressor 4.

Figure 4:
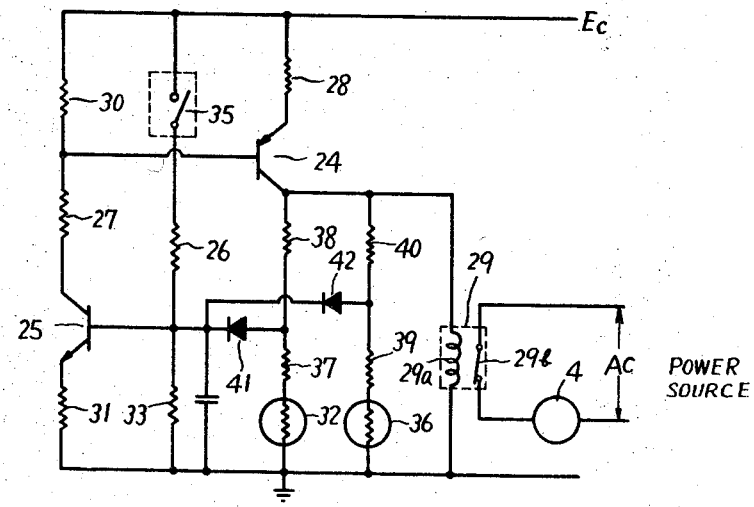
FIG. 4 is a diagram of defrosting control circuit for a refrigerator having a refrigerating chamber and a freezing chamber.
Figure 5:
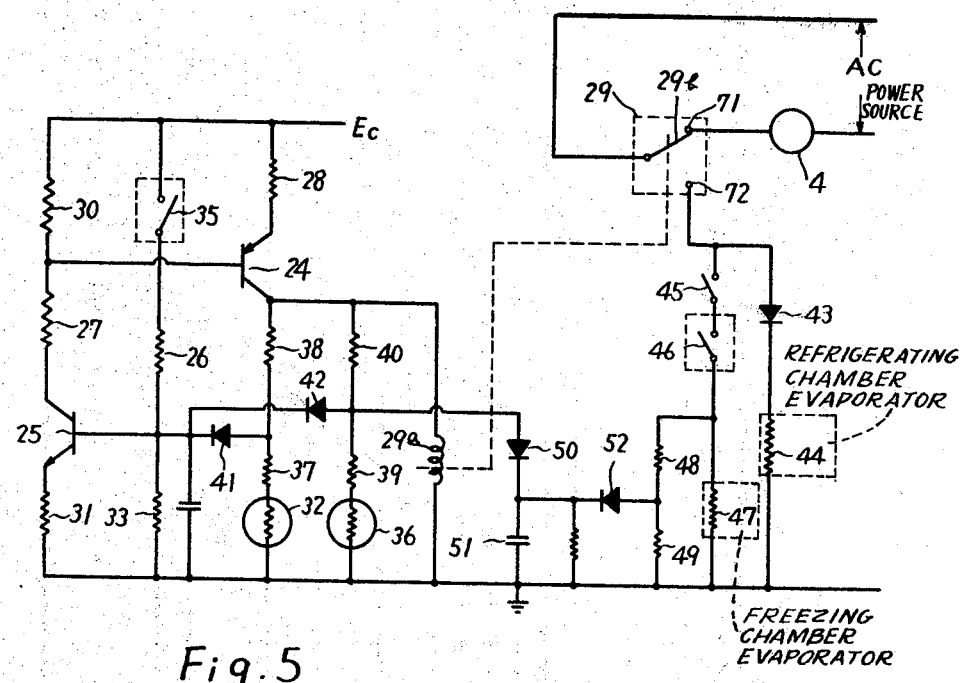
FIGS. 5 and 6 are diagrams of defrosting control circuits for the effecting of forced defrosting.
Figure 6:
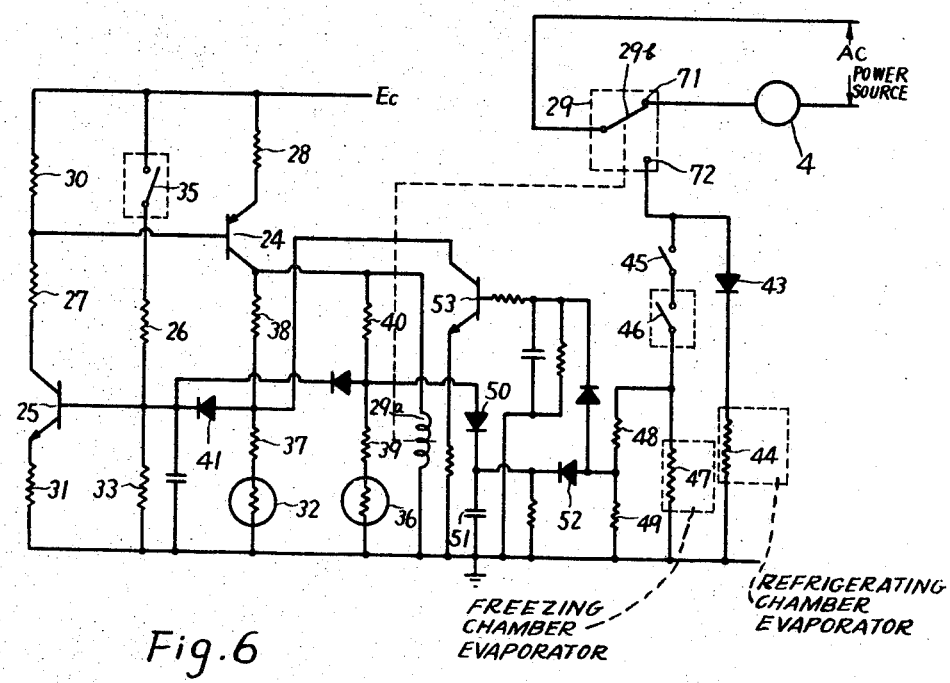

The defrosting control circuits shown in FIGS. 4, 5 and 6 are capable of simultaneously defrosting the evaporator of the refrigerating chamber and the evaporator of the freezing chamber or selectively defrosting either one of said evaporators.

FIG. 4 shows a defrosting control circuit similar to the circuit of FIG. 3 but which accomplishes defrosting by natural means without the aid of a heater. The circuit of FIG. 4 includes a thermistor 36 for detecting the completion of defrosting of the evaporator of the freezing chamber and a thermistor 32 for detecting the completion of defrosting of the evaporator of the refrigerating chamber. One end of the thermistor 32 is directly connected to the grounding line, and the other end is connected to the collector of the transistor 24 through a serial connection of resistors 37 and 38. Similarly, one end of the thermistor 36 is directly connected to the grounding line, and the other end is connected to the collector of transistor 24 through a serial connection of resistors 39 and 40. Further, the connecting points respectively of the resistors 37 and 38 and the resistors 39 and 40 are connected to the base of the supplementary transistor 25 by diodes 41 and 42 respectively, in order to provide a voltage comparison circuit. As in the case of FIG. 3, when the defrosting starting switch 35 is closed the circuit including the main transistor 24 and the supplementary transistor 25 becomes "latched," thereby energizing the electromagnetic coil 29a which opens the contact 29a thus stopping the operation of the compressor 4, so that natural defrosting is performed. Due to the operation of the voltage comparison circuit, the time of termination of the defrosting is controlled by whichever one of the thermistors 32 and 36 has a slower temperature rise.

The circuit shown in FIG. 5 is similar to the circuit shown in FIG. 4, and performs a forced defrosting with the aid of a heater. In FIG. 5, a serial circuit consisting of a refrigerating chamber defrosting heater 44 disposed adjacent to the refrigerating chamber evaporator and a diode 43, and a serial circuit consisting of a manual switch 45, a switch 46 which is controlled by the same timing structure as defrosting starting switch 35 and which closes at the same time as the defrosting starting switch 35 and a freezing chamber defrosting heater 47 disposed adjacent to the freezing chamber evaporator are connected in parallel between the contact point 72 of the electromagnetic relay 29 and the grounding line. The serial circuit of resistors 48 and 49 is connected in parallel to the freezing chamber defrosting heater 47. A serial circuit of a diode 50 and a condenser 51 is connected between the connecting point of the resistors 39 and 40 and the grounding line, further the connecting point of the diode 50 and the condenser 51 and the connecting point of the resistors 48 and 49 are connected by a diode 52 so as to form a constant voltage rectifying circuit.

If the manual switch 45 is previously closed, it is possible to simultaneously defrost both of the refrigerating chamber and the freezing chamber. In this case, when the defrosting starting switch 35 closes, the switch 46 also closes, and the circuit including the main transistor 24 and the supplementary transistor 25 becomes "latched" as in the case of the circiut of FIG. 3. Electromagnetic coil 29a is thereby energized to switch the movable member 29b to the contact point 72 so that power is supplied from the A.C. power source to the refrigerating chamber defrosting heater 44 and the freezing chamber defrosting heater 47, and the defrosting is commenced. A reverse bias voltage, which is divided by the resistors 48 and 49 and rectified by the diode 52 and the condenser 51, is applied to the diode 50, and, therefore, as in the circuit shown in FIG. 4, the defrosting is terminated by the release of the latch circuit by the voltage comparsion circuit in response to whichever one of the thermistors 32 and 36 has the slower temperature rise.

On the other hand, when the manual switch 45 or the switch 46 is open, only the refrigerating chamber heater 44 operates during the defrosting cycle. In this case, diode 50 is forward biased, and the thermistor 36 which detects the completion of the defrosting of the freezing chamber becomes idle, and the termination of the defrosting cycle is controlled by the thermistor 32 which detects the completion of the defrosting of the refrigerating chamber.

The circuit shown in FIG. 6 is similar to the circuit shown in FIG. 5 but includes an additional switching circuit comprising a transistor 53. This switching circuit substantially disenables the operation of the thermistor 32 for detecting the completion of the defrosting of the refrigerating chamber so that when both the refrigerating chamber defrosting heater 44 and the freezing chamber defrosting heater 47 are operated simultaneously, the defrosting cycle is terminated by the thermistor 36 of the freezing chamber. Except for this feature, the operation of the circuit of FIG. 6 is same as that of the circuit of FIG. 5.

Figure 7:
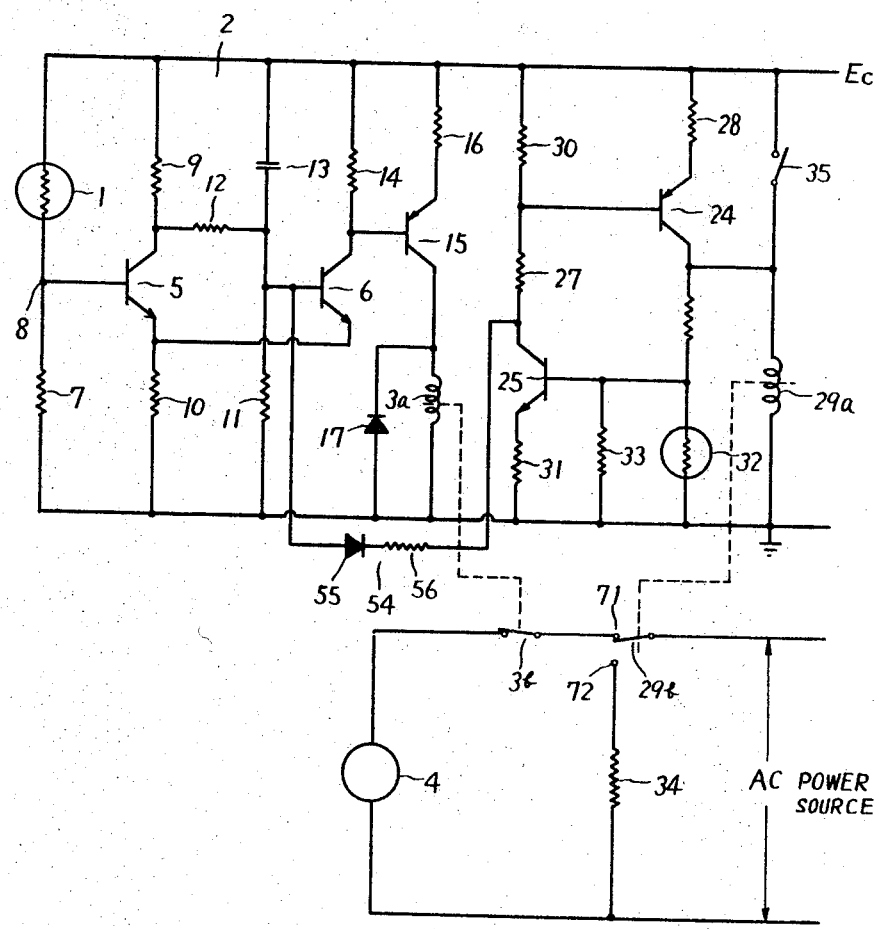
FIG. 7 is a diagram of another modified refrigerator control circuit according to this invention.

The circuit shown in FIG. 7 combines the temperature control circuit of FIG. 1 and the defrosting control circuit of FIG. 3. In addition, a feedback circuit 54 is provided between the temperature control section and the defrosting control section. The feedback circuit 54 includes a diode 55 and a resistor 56 which are connected in series between the base of transistor 6 of the Schmitt trigger circuit 2 in the temperature control section and the collector of the supplementary transistor 25 of the latch circuit in the defrosting control section.

When the defrosting control circuit is inactive, the diode 55 is reverse biased, but during the operation of the defrosting control circuit (during the defrosting cycle), diode 55 is forward biased with the result that a sufficient negative voltage is applied to the base of transistor 6 to cause transistor 6 to become nonconductive. Due to the nonconduction of said transistor 6, the electromagnetic coil 3a is disenabled, thus opening switch 3b and stopping compressor 4 while power is supplied to the defrosting heater 34.

It will be understood that the above-mentioned examples are illustrative only and are not to be construed as limitations upon the scope of this invention. It will also be understood that certain modifications of the illustrative embodiments may be made within the scope of the present invention. For example, it will be appreciated that by proper modification of the above-described circuits, thermosensitive resistance element having positive temperature characteristics can be employed.

Other modifications and adaptations of the illustrative embodiments may be made without departing from the spirit and scope of the invention as set forth with particularity in the appended claims.

What is claimed is:

1. A refrigerator temperature control circuit, comprising a thermosensitive resistance element disposed in the refrigerating chamber of a refrigerator for sensing temperature within the refrigerating chamber, an electromagnetic relay for controlling the operation of the refrigerator compressor, and a Schmitt trigger circuit connected between said thermosensitive resistance element and said electromagnetic relay for enabling said electromagnetic relay to operate the refrigerator compressor in response to a resistance value of said thermosensitive resistance element corresponding to a first temperature level in the refrigerating chamber and for disenabling said electromagnetic relay in response to a resistance value of said thermosensitive resistance element corresponding to a second temperature level in the refrigerating chamber, said second temperature level being lower than said first temperature level.

2. A refrigerator temperature control circuit comprising a plurality of thermosensitive resistance elements for sensing temperature at different places within the refrigerator chamber, a logic sum circuit connected to said thermosensitive resistance elements, an electromagnetic relay for controlling the operation of the refrigerator compressor, and a Schmitt trigger circuit connected between said logic sum circuit and said electromagnetic relay for enabling said electromagnetic relay to operate the refrigerator compressor in response to a resistance value of at least one of said thermosensitive resistance elements corresponding to a first temperature level and for disenabling said electromagnetic relay in response to a resistance value corresponding to a second temperature level, said second temperature level being lower than said first temperature level.

3. The refrigerator temperature control circuit of claim 2 wherein one of said thermosensitive resistance elements is disposed adjacent the refrigerating chamber evaporator and another of said thermosensitive resistance elements is disposed adjacent the freezing chamber evaporator.

4. A refrigerator temperature control circuit, comprising a defrosting starting switch, a latch circuit for maintaining a defrosting operation, said latch circuit becoming conductive in response to the instantaneous closing of said starting switch, and a thermosensitive resistance element disposed adjacent the evaporator of the refrigerating apparatus for sensing the absence of frost on said evaporator, said latch circuit becoming nonconductive in response to the instantaneous resistance value of said thermosensitive resistance element to terminate the defrosting operation.

5. The refrigerator temperature control circuit of claim 4, further comprising a plurality of thermosensitive resistance elements for sensing the completion of the defrosting operation, and a voltage comparison circuit connected between said thermosensitive resistance elements and said latch circuit for causing said latch circuit to become nonconductive when all of said thermosensitive elements sense temperatures above a predetermined level.

6. The refrigerator temperature control circuit of claim 5, whrein one of said thermosensitive resistance elements is disposed adjacent the refrigerating chamber evaporator and another of said thermosensitive resistance elements is disposed adjacent the freezer chamber evaporator.

7. The refrigerator temperature control circuit of claim 6, further comprising a pair of heating devices respectively disposed in said refrigerating chamber evaporator and said freezing chamber evaporator, said latch circuit being connected to operate said heating devices when in its conductive state.

8. The refrigerator temperature control circuit of claim 7, further comprising means for disenabling one of said thermosensitive resistance elements when its corresponding heating device is disenabled.

9. A refrigerator temperature control circuit, comprising a thermosensitive resistance element for sensing temperature, an electromagnetic relay for controlling the operation of the compressor of said refrigerator, a threshold circuit connected between said thermosensitive resistance element and said electromagnetic relay for enabling or disenabling said electromagnetic relay in accordance with the resistance variation of said thermosensitive resistance element, a defrosting starting switch, a latch circuit which becomes conductive in response to the instantaneous closing of said defrosting starting switch, a heating device connected to said latch circuit and disposed adjacent the evaporator of said refrigerator for defrosting said evaporator when said latch circuit is in its conductive state, a thermosensitive resistance element disposed in said evaporator for sensing the temperature thereof and for causing said latch circuit to become nonconductive at the completion of the defrosting of said evaporator, and a feedback circuit coupled between said latch circuit and said threshold circuit to cause said threshold circuit to disenable said electromagnetic relay so as to shut off said compressor of said refrigerator while said latch circuit is conducting.

References Cited

UNITED STATES PATENTS

| | | | |
|---|---|---|---|
| 3,038,106 | 6/1962 | Cutsogeorge | 236—78 |
| 3,222,882 | 12/1965 | Sutton | 62—156XR |
| 3,248,892 | 5/1966 | Sutton | 62—156XR |
| 3,335,576 | 8/1967 | Phillips | 62—156 |
| 3,363,429 | 1/1968 | Wechsler | 62—156 |

MEYER PERLIN, Primary Examiner

U.S. Cl. X.R.
62—227, 229, 234